United States Patent [19]

Reed et al.

[11] Patent Number: 5,217,190
[45] Date of Patent: Jun. 8, 1993

[54] PANEL YOKE

[75] Inventors: Brian E. Reed, Milford, N.H.; Randall J. Below, Woodbury, Conn.

[73] Assignee: The Siemon Company, Watertown, Conn.

[21] Appl. No.: 878,692

[22] Filed: May 5, 1992

Related U.S. Application Data

[63] Continuation-in-part of Ser. No. 566,126, Aug. 10, 1990, abandoned.

[51] Int. Cl.$^5$ .................................. H01H 9/00
[52] U.S. Cl. .................................. 248/27.3; 248/904; 248/56; 248/542; 200/296
[58] Field of Search ................ 248/27.3, 27.1, 56, 248/904, 542; 200/296; 439/544, 557, 567

[56] References Cited

U.S. PATENT DOCUMENTS

| | | |
|---|---|---|
| 2,424,757 | 7/1947 | Klumpp, Jr. . |
| 2,836,215 | 5/1958 | Rapata . |
| 2,889,125 | 6/1959 | Hart . |
| 3,079,581 | 2/1963 | Klumpp, Jr. . |
| 3,168,612 | 2/1965 | Sorenson . |
| 3,213,189 | 10/1965 | Mitchell et al. . |
| 3,329,785 | 7/1967 | Baer et al. . |
| 3,432,802 | 3/1969 | Ritchie . |
| 3,793,563 | 2/1974 | Brefka . |
| 4,080,522 | 3/1978 | Schimmels . |
| 4,154,498 | 5/1979 | Wood et al. . |
| 4,211,905 | 7/1980 | Quigley . |
| 4,340,795 | 7/1982 | Arthur . |
| 4,400,672 | 8/1983 | Bottelson . |
| 4,407,042 | 10/1983 | Schramme et al. . |
| 4,453,195 | 6/1984 | Sauer et al. . |
| 4,460,234 | 7/1984 | Bogese . |
| 4,461,938 | 7/1984 | Sorenson . |
| 4,543,557 | 9/1985 | Schaefer . |
| 4,560,227 | 12/1985 | Bukala . |
| 4,687,276 | 8/1987 | Stockmaster . |
| 4,707,765 | 11/1987 | Ohashi . |
| 4,730,363 | 3/1988 | Asbaghi ........................ 248/56 X |
| 4,731,925 | 3/1988 | Tanishi et al. ............... 200/296 X |
| 4,883,432 | 11/1989 | Reed .............................. 248/27.3 |
| 4,947,010 | 8/1990 | Heydner ........................ 200/296 |

*Primary Examiner*—Karen J. Chotkowski
*Attorney, Agent, or Firm*—Fishman, Dionne & Cantor

[57] ABSTRACT

A yoke for flush mounting a modular housing within an opening in a planar surface is disclosed. The yoke includes a flat plate having an aperture therethrough, a pair of hooks for securing a housing to the plate, a pair of gripper arms for securing the plate over the opening in the planar surface and locating tabs extending rearwardly from the plate to locate the housing in alignment with the opening in the flat plate. The hooks and locating tabs allow both lateral and axial insertion of the housing into the yoke.

24 Claims, 7 Drawing Sheets

PANEL YOKE

CROSS-REFERENCE TO RELATED APPLICATIONS

This is a continuation-in-part of copending application Ser. No. 566,126 filed Aug. 10, 1990 now abandoned.

TECHNICAL FIELD

The present invention is directed to the art of telecommunications devices.

BACKGROUND O THE INVENTION

Panel yokes for mounting telecommunication wiring hardware e.g., modular telephone jacks, within an opening defined by a flat panel surface are well known. A variety of conventional surface are available to accommodate applications requiring different panel thicknesses, apertures and connector housing designs.

For example, U.S. Pat. No. 3,213,189 discloses, a device for holding an article within an apertured support. The device includes a base defining an aperture therethrough, a pair of legs extending from the base. The legs have an engagement end for securing the device within an apertured support and a notch for securing an article, e.g. a switch within device. U.S. Pat. No. 4,211,905 discloses a switch assembly for mounting in a panel which includes a switch holder. The switch holder has a face plate having a longitudinal slot therethrough and having a pair of resilient legs having shoulders for supporting a switch within the holder and spring prongs for securing the holder within a panel opening. U.S. Pat. Nos. 4,434,339 discloses a mounting frame equipped with a decorative plate having a hole therethrough, having a pair of leg portions for positioning a switch or pilot light in alignment with the hole and having a pair of resilient plates having corrugated tips for securing the frame within a hole in a panel. U.S. Pat. No. 4,453,195 discloses a modular relay including a plug socket for mounting the relay in a panel opening. The plug socket having flanges and mounting feet for securing the socket within a panel and having retainer arms for retaining the relay within socket. FIG. 8 of the present application shows a prior panel yoke, more fully discussed below, having a plate defining an opening therethrough, having a pair of panels having hooks for retaining a jack therein, having ribs for locating in alignment with the opening 60 and having a pair of arms 52 for securing the yoke 46 within the panel opening.

The mounting means in each of the above described panel yokes is dedicated to a particular article to be mounted, i.e. each depends on registration of complimentary features on the panel yoke and the article in order to locate the article relative to the yoke and to secure the article to the yoke. A further disadvantage of each of the above described devices is that each allows insertion of the article into the yoke in a single direction only, i.e. axially forwardly. The limited access provided by each of the conventional yokes is inconvenient, particularly if the yoke or the article secured therein is to be replaced in the field, since the area in back of the panel and surrounding the yoke/article assembly is typically congested with wiring harnesses and other hardware.

What is needed in the art is a mounting yoke that is compatible with a wide variety of modular housings and wiring devices and allows insertion of such housings and devices into the yoke from a lateral as well as an axial direction.

SUMMARY OF THE INVENTION

A yoke for mounting a modular housing or connector in a Panel having a first aperture defined therein is disclosed. The yoke includes a plate for covering the first aperture. The Plate includes a front surface and a back surface and defines a second aperture therethrough. The yoke further includes means for snaplockedly securing the plate to the panel, locating means for aligning the modular housing with the second aperture and means for snaplockedly securing the housing against the back surface of the plate. The locating means allows both axial and lateral insertion of a modular housing into the yoke. The yoke is compatible with a wide variety of modular housings.

In a preferred embodiment, the second aperture is rectilinear and is defined by first and second pairs of opposed straight sides. The locating means includes locating tabs extending rearwardly from the back surface of the plate means on opposite sides of the first pair of opposed straight sides. The means for snaplockedly securing the modular housing against the back surface of the plate means includes a pair of resiliently defeatable cantilevered hooks extending rearwardly from the back surface of the plate means on opposite sides of the second pair of opposed sides.

In a preferred embodiment, each of the hooks extends rearwardly to a back end and the means for snaplockedly securing the plate means to the panel includes a pair of resiliently defeatable gripper arms. Each of the arms extends obliquely forwardly and outwardly from the back ends of the hooks.

In a preferred embodiment, each of the hooks includes a side panel extending laterally from a first edge to a second edge along one of the sides of the second pair of opposed sides and extending rearwardly from the back surface of the plate means to a back edge and having a ridge extending along the back edge. The ridge includes an inclined surface for guiding a modular housing between the side panels during axial insertion of the housing into the yoke and limit means for engaging the housing to prevent axial movement of the housing relative to the yoke. The first lateral edge of each side panel includes incline means for guiding the modular housing between the side panels during lateral insertion of the housing into the yoke.

BRIEF DESCRIPTION OF THE DRAWINGS

FIGS. 18A-18D are views of an insert for use with the panel yoke of FIG. 19 wherein FIG. 18A is a top view thereof, FIG. 18B is a bottom view thereof, FIG. 18C is an end view thereof, and FIG. 18D is a side elevational view thereof.

DETAILED DESCRIPTION OF THE INVENTION

Figure 4:
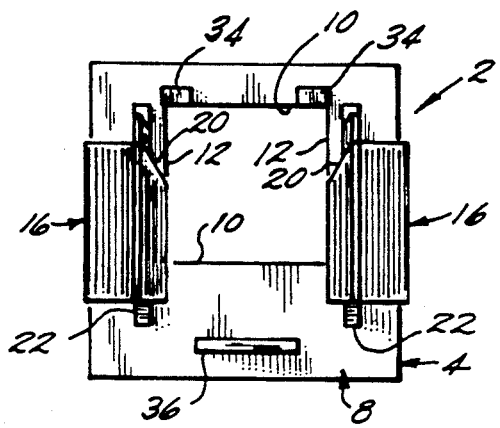
FIG. 4 shows a back view of the panel yoke of the present invention.
Figure 3:
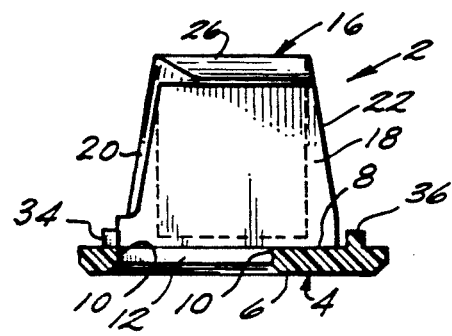
FIG. 3 shows a side section view of the panel yoke of the present invention taken along line 3—3 of FIG. 2.
Figure 2:
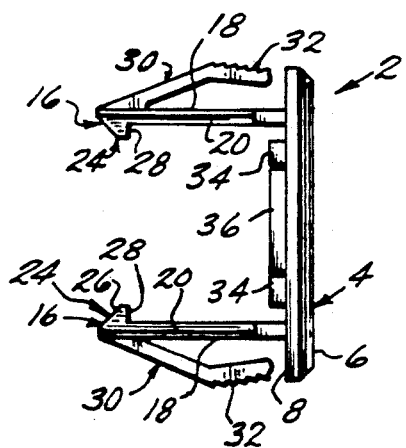
FIG. 2 shows a top view of the panel yoke of the present invention.
Figure 1:
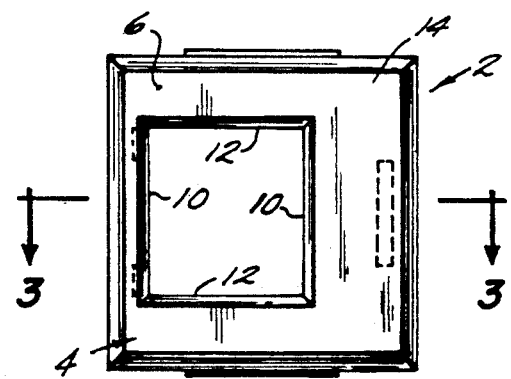
FIG. 1 shows a front view of the panel yoke of the present invention.

Referring to FIGS. 1 to 4, the panel yoke 2 of the present invention includes a flat plate 4 having a front surface 6 and a back surface 8. The edges of the front surface 6 are chambered. The plate 4 includes opposed pairs of chambered edges 10, 12 defining an aperture through the plate 4. A rectangular aperture is shown in FIGS. 1-4. Alternatively, the plate 4 may define a non-rectangular aperture, e.g. a circular aperture for use with bulkhead fiberoptic or coaxial connectors. Below the aperture on the front surface 6 of plate is a textured area 14, preferably having a matte finish, for individual field designation of the telecommunications outlet with, e.g. a marking pen or decal.

A pair of opposed resiliently defeatable cantilevered hooks 16 extend rearwardly from the back surface 8 of the plate 4 on opposite sides of the rectilinear opening. The hooks 16 each include a lateral panel 18. Each of the lateral panels 18 extends along one of the opposed edges 12 of the rectilinear opening in plate 4 from a ramped first edge 20 to a second edge 22 and extends rearwardly from the back surface 8 of the plate 4 to a ridged back edge 24. Each edge 24 includes an inclined surface 26 and an engagement surface 28.

The ramped edges 20 provide opposed inclined surfaces to guide a modular housing between the hooks 16 during lateral insertion and provides a lead-in angle along the side of an installed modular jack for receiving a tool, e.g. a screwdriver blade, for the purpose of defeating the hooks 16 of the yoke 2 to allow removal of the jack from the yoke 2. The inclined surfaces 26 are provided to guide a modular housing between the hooks 16 during axial insertion of the modular housing. The engagement surfaces 28 are parallel to the back surface 8 of Plate 4 and are provided for engaging the modular housing to Prevent axial movement of the modular housing relative to the back surface 8.

A pair of opposed resiliently defeatable gripper arms 30 extend obliquely forwardly and outwardly from the back edges of the hooks 16. Each of the gripper arms 30 includes a row 32 of teeth for gripping the sides of an opening in a mounting panel. The gripper arms 30 are resiliently deformable to allow the panel yoke 2 to be mounted in openings within a wide range of sizes, i.e. widths. The rows 32 of teeth allow the panel yoke to be mounted in panels within a wide range of panel thicknesses.

Opposed locating tabs 34, 36 extend rearwardly from the back surface 8 of the plate 4 on opposite sides 10 of the rectilinear opening in the plate 4.

When the yoke of the present invention is panel mounted, preload compresses the gripper arms 30 and applies a tensile force on panels 20. The resultant inward moment on panels 20 provides positive retention of a connector housing between the panels 20 but may give rise to high forces on the panels 20 if the panels 20 are deflected outwardly to insert a housing within or to remove a housing from a yoke 2 that is already mounted in a panel opening.

Figure 5:
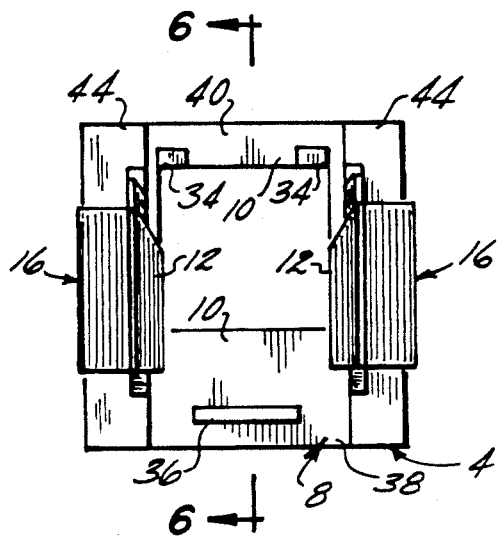
FIG. 5 shows a back view of an alternative embodiment of the panel yoke of the present invention.
Figure 6:
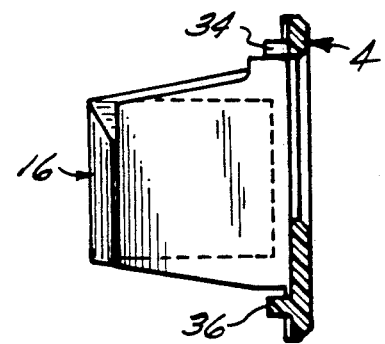
FIG. 6 shows a cross sectional side view taken along line 6—6 in FIG. 5.
Figure 7:
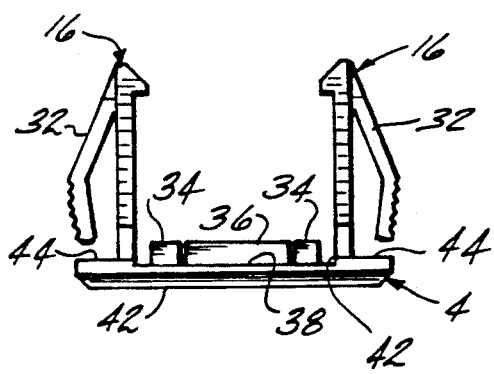
FIG. 7 shows a top view of the embodiment of FIG. 5.

FIGS. 5-7 show an alternative embodiment of the yoke 2 of the present invention in which the back surface 8 of the plate includes central recessed portions 38, 40 defined on opposite sides of the rectilinear aperture along edges 10 and between an opposed pair of steps 42 and an opposed pair of raised shoulder portions 44.

The recessed portion 38 permits flexure of plate 4 so that removal of a housing from a premounted yoke or insertion of a housing into a premounted yoke.

Figure 8:
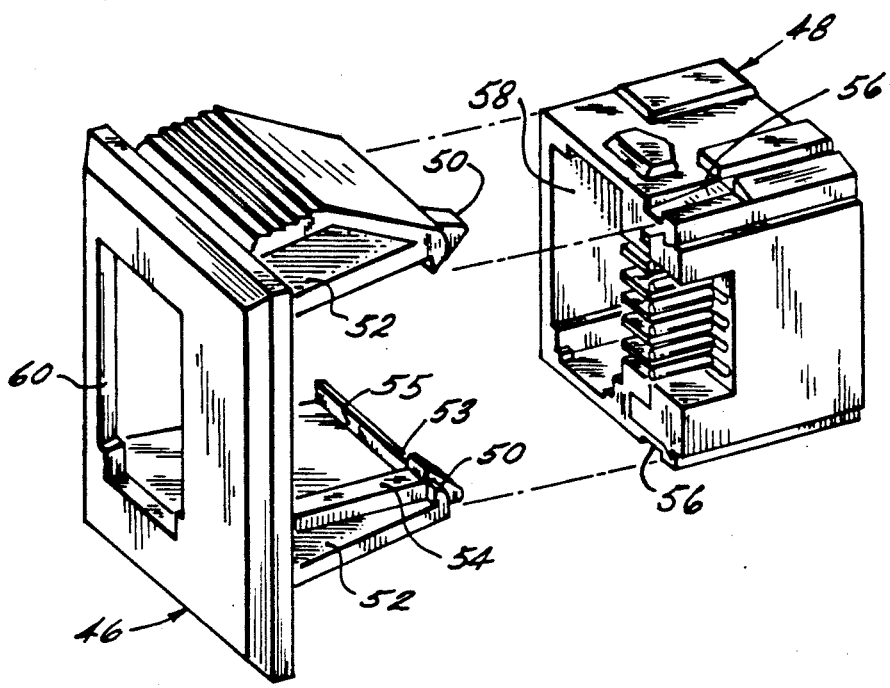
FIG. 8 shows a perspective view of a prior art panel yoke.

FIG. 8 shows a prior art panel yoke 46 and illustrates axial insertion of a modular telecommunications jack 48 into the yoke 46. As the jack 48 is inserted pressure on the inclined surfaces of hooks 50 force lateral panels 52 apart to receive the jack 48. Ribs 54 (only one of which is visible in FIG. 8) on panel 52 are received by grooves 56 on jack 48 to locate jack 48 so that the plug opening 58 of jack 48 is in alignment with aperture 60 defined in panel yoke 46. Once the ribs 54 engage the grooves 56, the jack 48 is displaceable relative to the yoke 46 in only the one direction, i.e. axially, and lateral movement of the jack 48 relative to the yoke 46 is not possible. Over the yoke 48 is fully inserted, panels 52 provide snaplocking engagement of surfaces 53, 55 with the jack 48.

Figure 9:
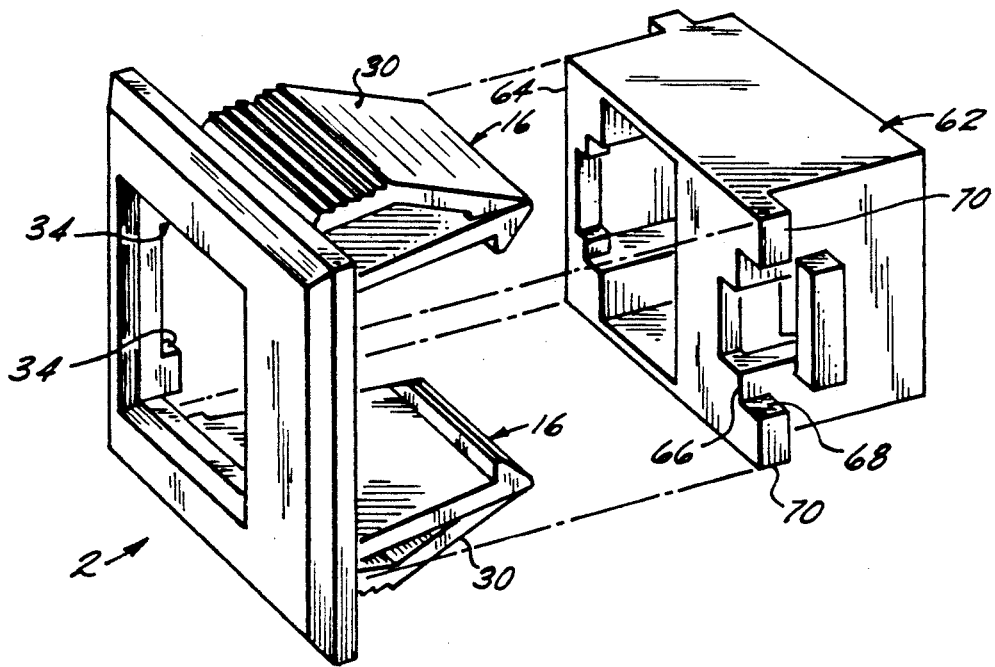
FIG. 9 shows a perspective view of a panel yoke of the present invention indicating axial insertion of a telecommunications jack.
Figure 10:
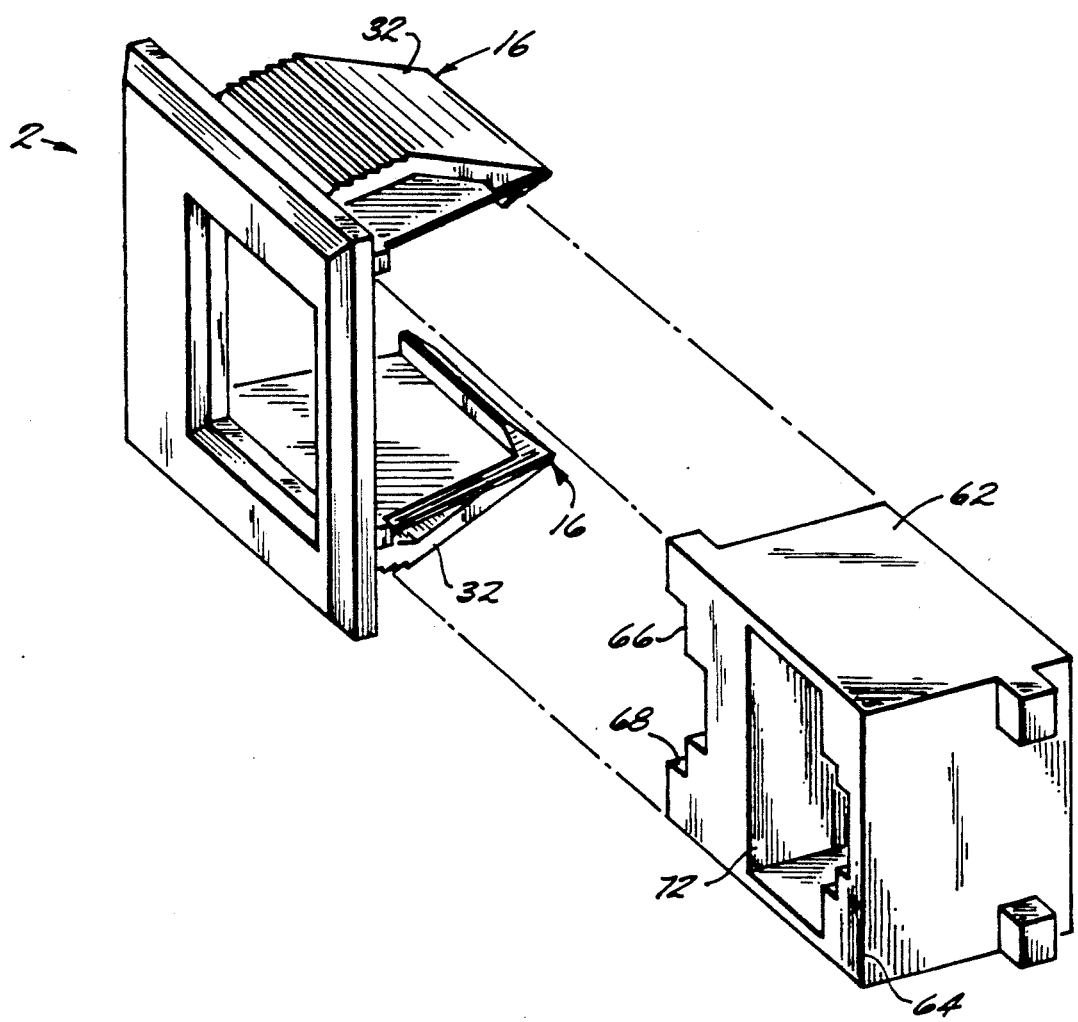
FIG. 10 shows a perspective view of a panel yoke of the present invention indicating lateral insertion of a telecommunications jack.
Figure 12:
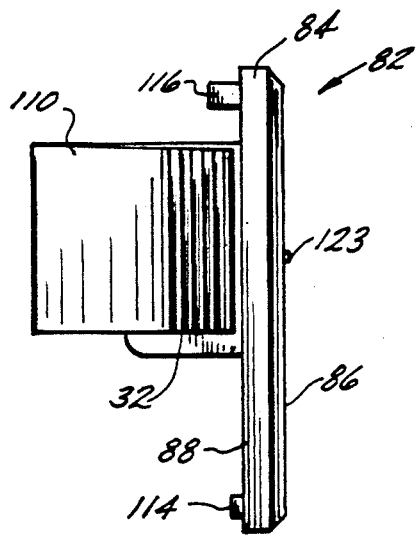
FIG. 12 shows a side view of the embodiment of FIG. 11.
Figure 11:
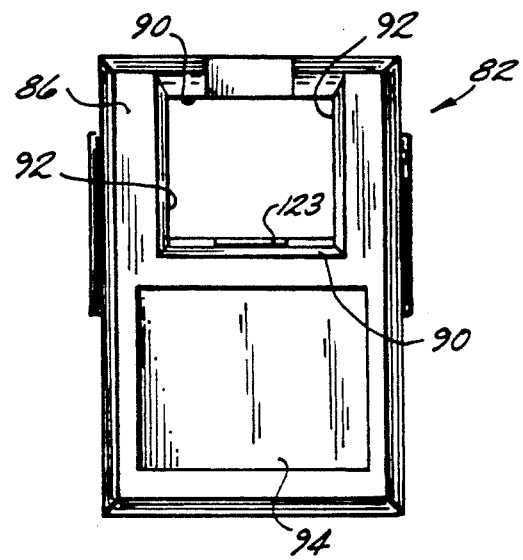
FIG. 11 shows a front view of a second alternate embodiment of the panel yoke of the present invention with a movable door panel in an open position.
Figure 13:
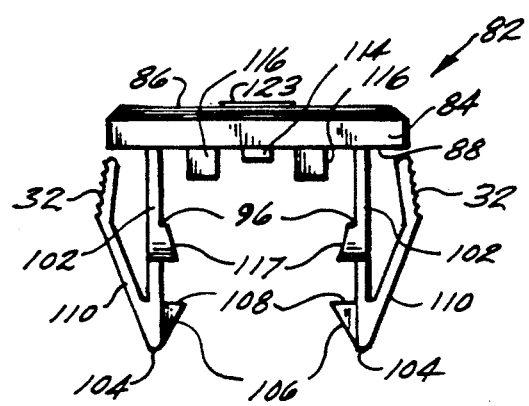
FIG. 13 shows a bottom view of the embodiment of FIG. 11.
Figure 14:
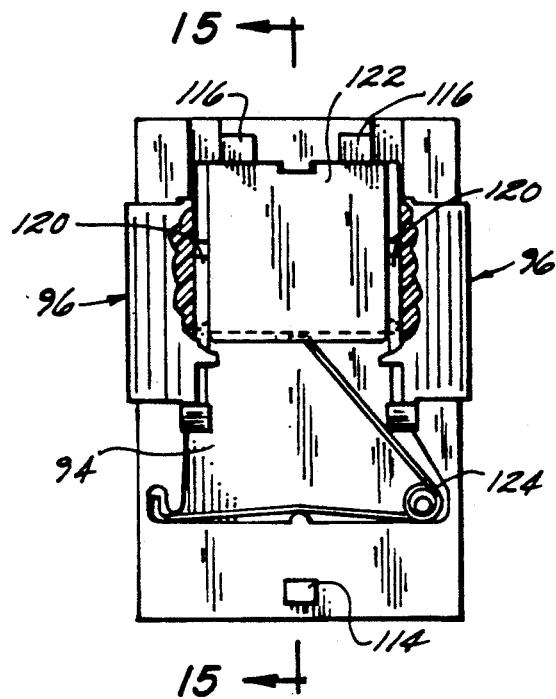
FIG. 14 shows a partially broken away back view of the embodiment of FIG. 11 with the movable door panel in the closed position.
Figure 15:
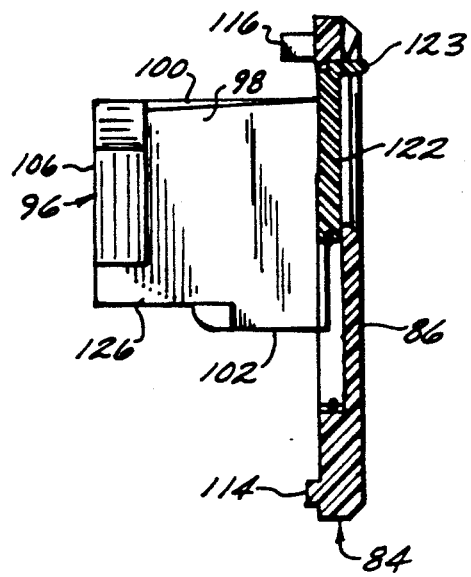
FIG. 15 shows a cross section side view taken along lines 15—15 of 14.
Figure 16:
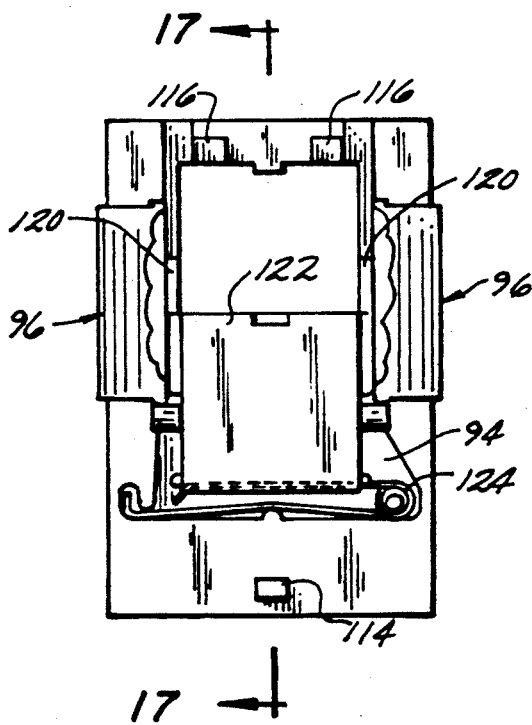
FIG. 16 shows a partially broken away back view of the embodiment of FIG. 11 with the movable door panel in the open position.
Figure 17:
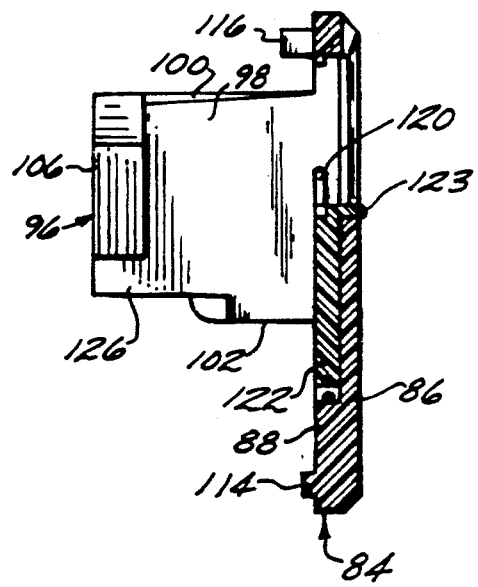
FIG. 17 shows a cross sectional side view taken along lines 17—17 of FIG. 16.
Figure 18A:
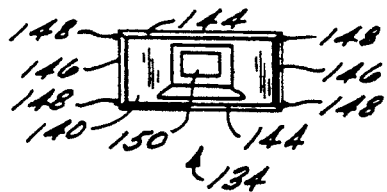
Figure 18B:
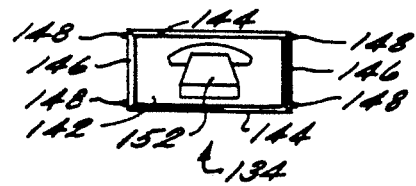
Figure 18C:
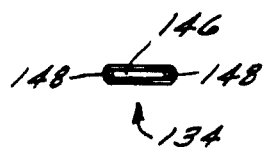
Figure 18D:
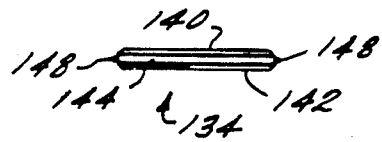

FIGS. 9 and 10 show a panel yoke 2 of the present invention and illustrate axial and lateral insertion of a modular telecommunications jack 62 into the yoke.

In FIG. 9, the yoke 2 allows axial insertion of the jack 62 in a manner analogous to that shown in FIG. 5 with regard to the prior art yoke, i.e., pressure on inclined surfaces 26 urges hooks 16 apart to receive the housing 62. However, since locating tabs 34, 36 extend from the back surface 8 of the flat plate 4 and engage jack 62 only when the jack 62 closely approaches the back surface 8 of the flat plate 4, the panel yoke 2 allows lateral insertion as well as axial insertion of the housing 62 into the yoke 2.

FIG. 10 illustrates lateral insertion of jack 62 into the yoke 2. As the jack 62 is laterally inserted, pressure on ramped edges 20 urges hooks 16 apart to receive the jack 62. Once the jack 62 is laterally inserted in the yoke 2, the edges 64, 66, 68 of the jack 62 are aligned with tabs 34, 36 and the jack 62 is displaced axially toward the back surface 8 of the flat panel 4 to allow hooks 16 to snaplockedly engage to jack 62. Unlike the prior art device shown in FIG. 5, which relies on interlocking ribs 54 and channels 56 to locate and laterally secure the connector housing, the panel yoke of the present invention relies solely on contact with outside edges 64, 66, 68 of the connector housing 62. Since yoke 2 may be used to secure any substantially box-shaped housing with similar overall dimensions, the need for special guidance, location or retention features in the housing 62 are eliminated. As shown in FIGS. 9 and 10, standard connector housings are positively oriented with respect to the aperture in plate 2 by means of locating tabs 34, 36 which, when improperly oriented, interfere with housing tabs 70 thereby preventing engagement of surfaces 28 with the housing.

A further limitation of the stepped-in latching surface of the prior art design shown in FIG. 8 is that misalignment of the ribs 60 and corresponding latching surface 62 with the jack housing results in excessive deflection of lateral panels 52. To prevent this condition from resulting in non-elastic deformation of the lateral panels 52, the prior art design is inherently more limited with respect to the depth of latching surfaces 53 and 55 than those of the present invention. Also, while ribs 54 do increase flexural stiffness of the lateral Panels 52, the increased flexural thickness raises maximum stress on the outer surfaces thereby limiting the resiliency of direction provided by lateral panels 18 of the device of the present invention.

As discussed above, the lateral locating ribs of the prior art yoke preclude insertion of the modular jack in directions other than axially forwardly while the lateral locating tabs of the yoke of the present invention allow either axial or lateral insertion of a modular jack. The ability to move the jack along at least two axes relative to the yoke is advantageous, particularly if the yoke must be replaced in the field, since the area surrounding the yoke/housing assembly typically blocked with wiring harnesses and mounting hardware. The device of the present invention overcomes severe limitations of prior art panel yoke designs by allowing for comparability with a relatively wide range of panel thicknesses and opening sizes and by axial snap lock engagement to both the connector housing and panel thereby allowing for assembly in either the factory or field without ancillary fastening devices or assembly aids.

The device of the present invention offers the end user a means to facilitate the administration of wiring facilities by allowing for color coding of individual telecommunications outlets to correspond with service type, e.g. voice or data, or building location.

Referring to FIGS. 11-18, a preferred panel yoke embodiment 82 includes a flat plate 84 having a front surface 86 and a back surface 88. The plate 84 includes opposed pairs of chamfered edges 90, 92 defining a rectilinear aperture through plate 84. A textured area 94, preferably having a matte finish, is defined on the front surface 86 of plate 84 for individual field designation of the telecommunications outlet with, e.g. a marking pen or a decal.

A pair of opposed resiliently defeatable cantilevered hooks 96 extend rearwardly from the back surface 88 of plate 84 on opposite sides of the rectilinear opening. Each of the hooks includes a lateral panel 98. Each lateral panel 98 extends along one of the pair of opposed edges 92 from a ramped first edge 100 to a second edge 102 and extends rearwardly from the back surface 88 to a ridged back edge 104. Each ridged back edge 104 includes an inclined surface 106 and an engagement surface 108.

The ramped edges 100 provide opposed inclined surfaces to guide a modular housing between hooks 96 during lateral insertion. The inclined surfaces 106 are provided to guide a modular housing between hooks 96 during axial insertion. The engagement surfaces 108 are oriented parallel to back surface 88 and are provided for engaging the modular housing to prevent axial movement of the modular housing relative to the panel 84.

Ramped edges 126 provide an area for inserting a screwdriver to pry hooks 96 apart to facilitate insertion of a modular housing or connector into panel yoke 82 or removal of a modular housing or connector from panel yoke 82.

A pair of opposed resiliently defeatable gripper arms 110 extend obliquely forwardly and outwardly from the back edges of hooks 96. Each of the gripper arms 110 includes a row of teeth for gripping the sides of an opening in a mounting panel.

Opposed locating tabs 114, 116 extend rearwardly from the back surface 88 of plate 84 on opposite sides 90 of the rectilinear opening in plate 84. A pair of locating tabs 117 extend inwardly from the second edges 102 of the hooks 96.

Figure 19:
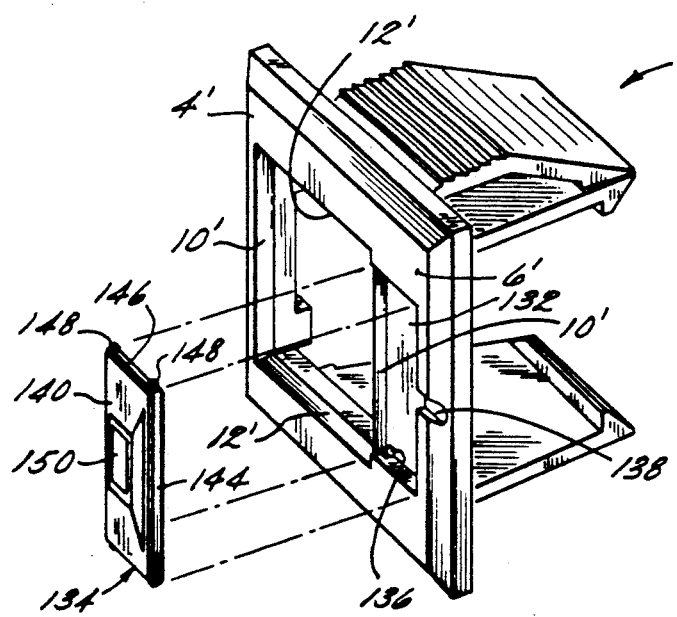
FIG. 19 is an exploded perspective view of the panel yoke in accordance with a third alternate embodiment of the present invention.
Figure 20:
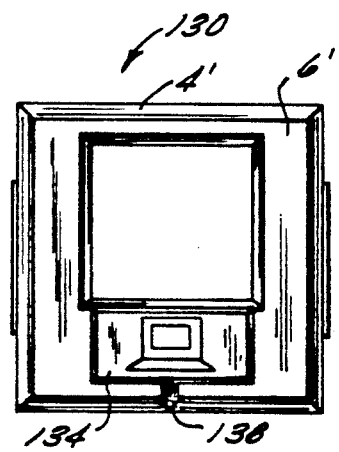
FIG. 20 is a front view of the panel yoke of FIG. 19.

A pair of opposed slots 120 are defined in panel 84 along edges 92. A door panel 122 including a stop 123 is slidably received within the pair of slots 120. The door panel 122 has a closed position, shown in FIGS. 14 and 15, wherein the door panel 122 covers the rectangular opening in panel 84 and an open position shown in FIGS. 11, 16 and 17, wherein the door panel 122 is withdrawn within the recessed area 94 to uncover the rectangular opening in the panel 84. A spring 124 urges the door panel 122 into the closed position. Referring to FIGS. 19 and 20 a panel yoke in accordance with a third alternate embodiment of the present invention is shown generally at 130. Panel yoke 130 is generally the same as panel yoke 2 of the FIG. 1 embodiment wherein common elements are denoted by primed numbers. The difference comprising a recess 132 in a surface 6' or a flat plate 4' which has an insert 134 snap lockedly secured therein. Recess 132 is located directly below an aperture defined by opposing pairs of chamfered edges 10' and 12'. Insert 134 includes a symbol or is otherwise marked to provide identification of the jack. An aperture 136 is located at each of the four corners of recess 132. An extension 138 of recess 132 is provided to facilitate removal of insert 134.

Referring to FIGS. 8A-D, insert 134 is shown. Insert 134 comprises a pair of opposing surfaces 140, 142 and first and 142 are chamfered. A pair of protruding elements 148 extend from each surface 146. Insert 134 is snap lockedly inserted into recesses 132. The snap locking feature comprises the mating of elements 148 with apertures 136 of recess 132. Two lower elements 148 allow the insert to hinge in the apertures 136 to act as a door. Insert 134 may include designations on either surface 140 or 142. A computer terminal 150 is illustrated on surface 140 (FIG. 14A) and a telephone 152 is illustrated on surface 142 by way of example. It will be appreciated that any designation symbol or term may be molded into or imprinted on these surfaces as will be dictated by the application thereof. Insert 134 may be removed by inserting a rigid member (not shown) between insert 134 and plate 4' at extension 138. The member is urged outwardly until elements 148 are released front apertures 136. Insert 134 may then be removed from panel yoke 130.

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. A yoke for mounting a modular housing in a panel, said panel having a first aperture defined therein, comprising:

plate means for covering the first aperture, said plate means including a front surface and a back surface and defining a second aperture therethrough wherein the second aperture is a rectilinear aperture defined by first and second pairs of opposed straight sides and wherein the back surface of the plate includes first and second recessed portions defined on opposite sides of the first pair of sides of the second aperture for increasing flexibility of the panel and includes first and second raised shoulder portions defined on opposite sides of the second pair of sides of the second aperture;

first snaplocking means for snaplockedly securing said plate means to said panel;

locating means extending rearwardly from the back surface of the plate means, for aligning the modular housing with the second aperture, said locating means allowing both axial and second snaplocking means for snaplockedly securing said modular housing against the back surface of the plate means, said second snaplocking means comprising a pair of resiliently defeatable cantilevered hooks extending rearwardly from the back surface of the plate means on opposite sides of the second pair of opposed sides of the second aperture.

2. The yoke of claim 1, wherein each of the hooks extends rearwardly to a back end, and wherein the means for snaplockedly securing the plate means to the panel comprises:

a pair of opposed resiliently defeatable gripper arms, each extending obliquely forwardly and outwardly from the back end of one of said hooks.

3. The yoke of claim 2, wherein each of the gripper arms further comprises tooth means for contacting the panel to grip the panel.

4. The yoke of claim 1, wherein each of the hooks comprises:

a side panel extending laterally from a first lateral edge to a second lateral edge along one of the sides of the second pair of opposed sides of the second aperture and extending rearwardly from the back surface of the plate means to a back edge; and a ridge extending along the back edge of the panel.

5. The yoke of claim 4, wherein the ridge comprises incline means for guiding the modular housing between the side panels during axial insertion of the modular housing and limit means for engaging the housing to prevent axial movement of the housing relative to the panel means.

6. The yoke of claim 4, wherein said at least one each side panel includes incline means for guiding the modular housing between the side panels during lateral insertion of said housing into said yoke.

7. The yoke of claim 1 wherein said front surface of said plate means includes a recess having a plurality of openings.

8. The yoke of claim 7 further comprising:

insert means disposed in said recess for providing means of identification of these modular jack, said insert means having opposing surfaces receptive to said means of indemnification; and at least one protruding element extending outwardly from opposing sides of said insert means, said protruding elements disposed in said openings of said recess.

9. The yoke of claim 8 wherein said at least one protruding element comprises:

at least two lower protruding elements which function as a hinge.

10. A yoke for mounting a modular housing in a panel, said panel having a first aperture defined therein, comprising:

plate means for covering the first aperture, said plate including a front surface and a back surface and defining a second aperture therethrough, said second aperture being a rectilinear aperture and being defined by first and second pairs of opposed straight sides;

locating means for aligning the modular housing with the second aperture, said locating means comprising opposed locating tabs extending rearwardly from the back surface of the plate means on opposite sides of the first pair of opposed straight sides and said locating means allowing both axial and lateral insertion of a modular housing into said yoke;

means for snaplockedly securing the modular housing against the back surface of the plate means, said means for snaplockedly securing the modular housing comprising a pair of resiliently defeatable cantilevered hooks extending rearwardly from the back surface of the plate means to a back end on opposite sides of the second pair of straight opposed sides, each of said hooks comprising a side panel extending laterally from a first lateral edge to a second lateral edge along one of the sides of the second pair of straight sides and extending rearwardly from the back surface of the plate means to a back edge and a ridge extending along the back edge of the panel, said ridge comprising incline means for guiding the modular housing between the side panels during axial insertion of the modular housing and limit means for engaging the housing to prevent axial movement of the housing relative to the panel means and wherein the first lateral edge of each side panel includes incline means for guiding the modular housing between the side panels during lateral insertion of the housing into the yoke; and means for snaplockedly securing the plate means to the panel, said means for snaplockedly securing the plate means comprising a pair of opposed resiliently defeatable gripper arms, each extending obliquely forward and outwardly from the back end of one of said hooks.

11. The yoke of claim 10, further comprising means for covering the second aperture.

12. The yoke of claim 10, wherein the means for covering the second aperture comprises:

slot means, defined by said plate means and operatively associated with the second aperture for slidably mounting a door panel;

a recessed portion defined in the back surface of the plate means;

a door panel slidably received within the slot means, said door panel having a closed portion wherein the door panel covers the second aperture and having an open position wherein the door panel is withdrawn into the recessed portion to uncover the second aperture; and resilient means for urging the door panel into the closed position.

13. The yoke of claim 10 wherein said front surface of said plate mans includes a recess having a plurality of openings.

14. The yoke of claim 13 further comprising:

insert means disposed in said recess for providing means of identification of said modular jack, said insert means having opposing surfaces receptive to said means of identification; and at least one protruding element extending outwardly from opposing sides of said insert means, said protruding elements disposed in said openings of said recess.

15. The yoke of claim 14 wherein said at least one protruding element comprises:

at least two lower protruding elements which function as a hinge.

16. A yoke for mounting a housing in panel, said panel having a first aperture defined therein, comprising:

plate means for covering the first aperture, said plate means including a front surface and a back surface and defining a second aperture therethrough, said second aperture being defined by first and second pairs of opposed sides;

means for snaplockedly securing said plate means to said panel;

locating means, extending rearwardly from the back surface of the plate means, for aligning the modular housing with the second aperture, said locating means comprising opposed locating tabs extending rearwardly from the back surface of the plate means on the first pair of opposite sides of the second aperture and said locating means allowing both axial and lateral insertion of the modular housing into said yoke; and means for snaplockedly securing said modular housing against the back surface of the plate means, said means for snaplocking, comprising:

a pair of resiliently defeatable cantilevered hooks extending rearwardly from the back surface of the plate means on the second pair of opposite sides of the second aperture, each of said hooks comprising:

a side panel extending laterally from a first lateral edge to a second lateral edge along one of the sides of the second pair of opposed sides of the second aperture and extending rearwardly from the back surface of the plate means to a back edge, wherein the first lateral edge of each side panel includes means for guiding the modular housing between the side panels during lateral insertion of said housing into said yoke; and a ridge extending along the back edge of the panel, wherein the ridge comprises incline means for guiding the modular housing between the side panels during axial insertion of the modular housing and limit means for engaging the housing to prevent movement of the housing relative to the panel means.

17. The yoke of claim 16, wherein each of the hooks extends rearwardly to a back end, and wherein the mans for snaplockedly securing the plate means to the panel comprises:

a pair of opposed resiliently defeatable gripper arms, each extending obliquely forwardly and outwardly from the back end of one of said hooks.

18. The yoke of claim 16, wherein each of the gripper arms further comprises tooth means for contacting the panel to grip the panel.

19. The yoke of claim 16, further comprising means for covering the second aperture.

20. The yoke of claim 16, wherein the means for covering the second aperture comprises:

slot means, defined by said plate means and operatively associated with the second aperture for slidably mounting a door panel;

a recessed portion defined in the back surface of the plate means;

a door panel slidably received within the slot means, said door panel having a closed portion wherein the door panel covers the second aperture and having an open position wherein the door panel is withdrawn into the recessed portion to uncover the second aperture; and resilient means for urging the door panel into the closed position.

21. The yoke of claim 16 wherein said front surface of said plate means includes a recess having a plurality of openings.

22. The yoke of claim 21 further comprising:

insert means disposed in said recess for providing means of identification of said modular jack, said insert means having opposing surfaces receptive to said means of identification; and at least one protruding element extending outwardly from opposing sides of said insert means, said protruding elements disposed in said openings of said recess.

23. The yoke of claim 22 wherein said at least one protruding element comprises:

at least two lower protruding elements which function as a hinge.

24. A yoke for mounting a modular housing in a panel, said panel having a first aperture defined therein, comprising:

plate means for covering the first aperture, said plate means including a front surface and a back surface and defining a second aperture therethrough wherein the second aperture is a rectilinear aperture defined by first and second pairs of opposed straight sides and wherein the back surface of the plate includes first and second recessed portions defined on opposite sides of the first pair of sides of the second aperture for increasing flexibility of the panel and includes first and second raised shoulder portions defined on opposite sides of the second pair of sides of the second aperture;

means for snaplockedly securing said plate means to said panel;

locating means extending rearwardly from the back surface of the plate means, for aligning the modular housing with the second aperture, said locating means allowing both axial and lateral insertion of the modular housing into said yoke;

means for snaplockedly securing said modular housing against the back surface of the plate means;

means for covering the second aperture, wherein the means for covering the second aperture comprises;

slot means, defined by said plate means and operatively associated with the second aperture for slidably mounting a door panel;

a recessed portion defined in the back surface of the plate means;

a door panel slidably received within the slot means, said door panel having a closed position wherein the door panel covers the second aperture and having an open position the door panel is withdrawn into the recessed portion to uncover the second aperture; and resilient means for urging the door panel into the closed position.

* * * * *